United States Patent
Lee et al.

(10) Patent No.: US 9,141,204 B2
(45) Date of Patent: Sep. 22, 2015

(54) DYNAMIC SCALE FOR MOUSE SENSOR RUNAWAY DETECTION

(71) Applicant: PixArt Imaging Inc., Hsin-Chu (TW)

(72) Inventors: Joon Chok Lee, Hsin-Chu (TW); Zi Hao Tan, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 81 days.

(21) Appl. No.: 14/182,293

(22) Filed: Feb. 18, 2014

(65) Prior Publication Data

US 2015/0234483 A1 Aug. 20, 2015

(51) Int. Cl.
*G06F 3/0354* (2013.01)
*G06F 3/03* (2006.01)

(52) U.S. Cl.
CPC .......... *G06F 3/03543* (2013.01); *G06F 3/0312* (2013.01)

(58) Field of Classification Search
CPC ... G06F 3/0317; G06F 3/03543; G06F 3/038; G06F 3/0383; G06F 3/0421; G06F 3/033; G06F 3/0304
USPC .......................................... 345/157, 163, 166
See application file for complete search history.

(56) References Cited

U.S. PATENT DOCUMENTS

| 2006/0209015 | A1 | 9/2006 | Feldmeier |
| 2007/0297545 | A1 | 12/2007 | Chen |
| 2011/0038508 | A1* | 2/2011 | Teoh et al. .................... 382/103 |
| 2012/0020520 | A1 | 1/2012 | Lin |

FOREIGN PATENT DOCUMENTS

| CN | 1834878 | 5/2010 |
| TW | 200803262 | 1/2008 |
| TW | 201122920 | 7/2011 |

* cited by examiner

*Primary Examiner* — Koosha Sharifi-Tafreshi
(74) *Attorney, Agent, or Firm* — Winston Hsu; Scott Margo

(57) ABSTRACT

A method for dynamically setting a scale for performing a cross-correlation check between a reference image and a comparison image of a mouse includes: setting a plurality of scale sizes for a cross-correlation check; providing a look up table (LUT) mapping the plurality of scale sizes to a plurality of overlapped areas of the reference image and comparison image and a plurality of predicted locations for the cross-correlation; determining a velocity of motion of the mouse, and using the determined velocity to generate a predicted location; inputting the predicted location to the LUT and mapping to a scale size; and performing the cross-correlation check according to the scale size.

3 Claims, 2 Drawing Sheets

▨ Reference image

▧ Comparison image

▩ Overlapping image

● Predicted location

Reference image

Comparison image

Overlapping image

Predicted location

DYNAMIC SCALE FOR MOUSE SENSOR RUNAWAY DETECTION

BACKGROUND OF THE INVENTION

1. Field of the Invention

The present invention relates to cross-correlation checking for a computer mouse, and more particularly, to a cross-correlation method for a computer mouse which can selectively adjust a scale size for performing a cross-correlation check.

2. Description of the Prior Art

A mouse is one of the most popular and commonly used input devices for a computer. A standard mouse comprises a wheel or an optical sensor, which is used to determine motion of the wheel/sensor relative to a 2-D surface, and then transform the motion into motion of a cursor or arrow on a display screen of the computer.

In order to detect the movement of an optical mouse, the optical sensor captures a first frame at a first time as a reference image, and captures a second frame at a second time as a comparison image, wherein the difference between the first time and the second time is equivalent to a frame rate period of the mouse. Cross-correlation is then performed between the reference image and the comparison image in order to determine the motion of the mouse during the time period between the two captured frames.

Please refer to FIG. 1, which illustrates an example of a reference frame and a comparison frame captured by a mouse moving at a particular velocity. In FIG. 1, the reference frame is illustrated by a 10×10 block filled in with diagonal lines sloping to the right, and the comparison frame is illustrated by a 10×10 block filled in with diagonal lines sloping to the left. As illustrated in the diagram, there is a certain offset between the two images, which is illustrated by the overlapped area having a crosshatch pattern. This overlapped area can be used to determine the distance the mouse has moved during the time period between the two captured frames. Cross-correlation can be performed for the entire two frames in order to determine the exact size and location of the overlapped area, but this is time-consuming, particularly when the mouse is moving at high speeds, as the size of the offset/overlapped area becomes smaller at higher speeds. Therefore, a limited amount of cross-correlation is performed between the two frames.

The mouse sensor navigation system thereby uses a location predicted to have the peak correlation as a predicted location which indicates where the cross-correlation should be centered. The predicted location corresponds to the accumulated delta of the mouse from frame to frame and is illustrated by the black dot in FIG. 1. The correlation process can be represented by the following equation:

$$XC(r,c)$$

wherein XC represents cross-correlation, and (r,c) represents the reference frame and comparison frame at their respective predicted locations.

If the predicted location is incorrect, the cross-correlation performed at the wrong predicted location will lead to an incorrect motion of the mouse will be reported. This incorrect reported motion will then be used as a basis for a next predicted location, meaning the next predicted location will also be incorrect. This may result in what is known as a runaway mouse situation, where the mouse is actually stationary but the cursor on the display screen continues to move.

To correct for the above-mentioned problem, conventional methods perform a cross-correlation check at the origin, i.e. location (0,0). A scale is applied to the cross-correlation, wherein the scale will have a constant value.

When the following condition is met:

$$XC(0,0)*\text{Scale} > XC(r,c)$$

it is determined that a runaway situation has occurred.

When the runaway situation occurs, the navigation process of the mouse needs to be reset. This involves clearing the predicted location and any unreported motion as well as re-capturing of a new reference image. A navigation reset therefore needs to take place before tracking can occur once more.

In some situations, however, the mouse may be moving in accordance with the cursor on the display screen, but the system will still falsely report a runaway situation. This is usually due to the scale being set too high for the cross-correlation check, which results in unnecessary clearing of both predicted location and any unreported motion. This false reporting will require resetting of the navigation process, which might produce a noticeable frozen cursor and can be annoying to a user. In extreme cases, resetting of the navigation process due to a false runaway situation might actually result in the mouse being unable to track. If, however, the scale for the cross-correlation check is set too low then it is difficult to detect a real runaway situation.

SUMMARY OF THE INVENTION

A method for dynamically setting a scale for performing a cross-correlation check between a reference image and a comparison image of a mouse comprises: setting a plurality of scale sizes for a cross-correlation check; providing a look up table (LUT) mapping the plurality of scale sizes to a plurality of overlapped areas of the reference image and comparison image and a plurality of predicted locations for the cross-correlation; determining a velocity of motion of the mouse, and using the determined velocity to generate a predicted location; inputting the predicted location to the LUT and mapping to a scale size; and performing the cross-correlation check according to the scale size.

These and other objectives of the present invention will no doubt become obvious to those of ordinary skill in the art after reading the following detailed description of the preferred embodiment that is illustrated in the various figures and drawings.

DETAILED DESCRIPTION

In order to correct for the above-mentioned disadvantages, the present invention uses a dynamic scale for the cross-correlation check, which changes in size according to the predicted location for cross-correlation and therefore the size of the overlapping region between reference and comparison frames.

Figure 1:
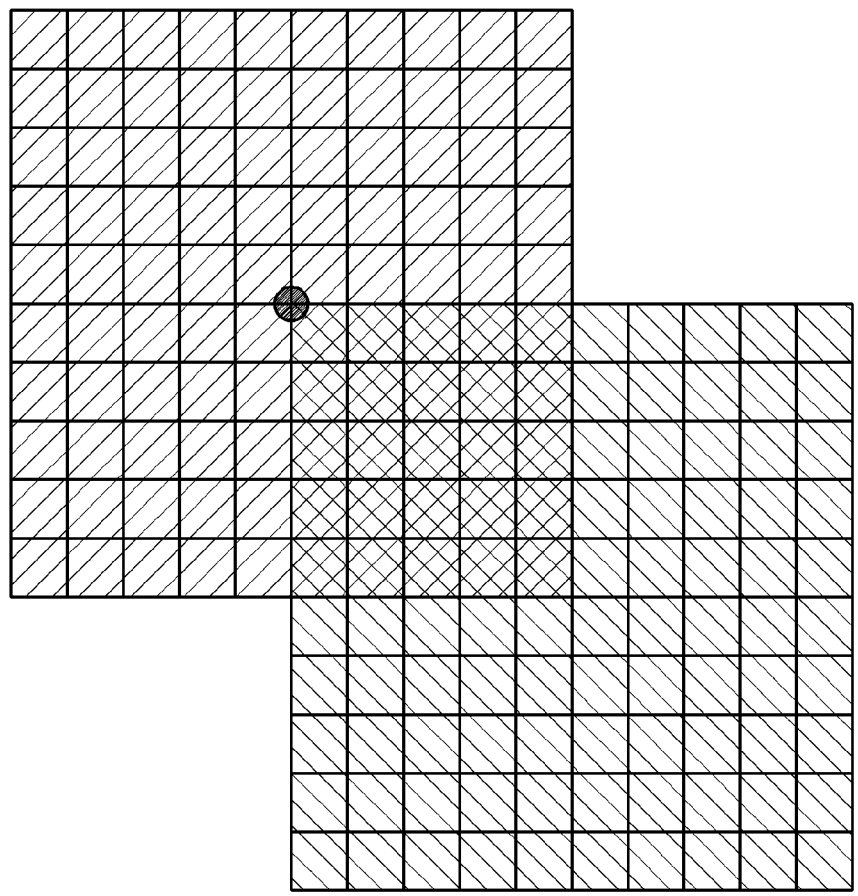
FIG. 1 is a diagram of a reference frame and a comparison frame and an offset according to a first predicted location.
Figure 1:
Figure 1:
Figure 1:
Figure 1:
Figure 2:
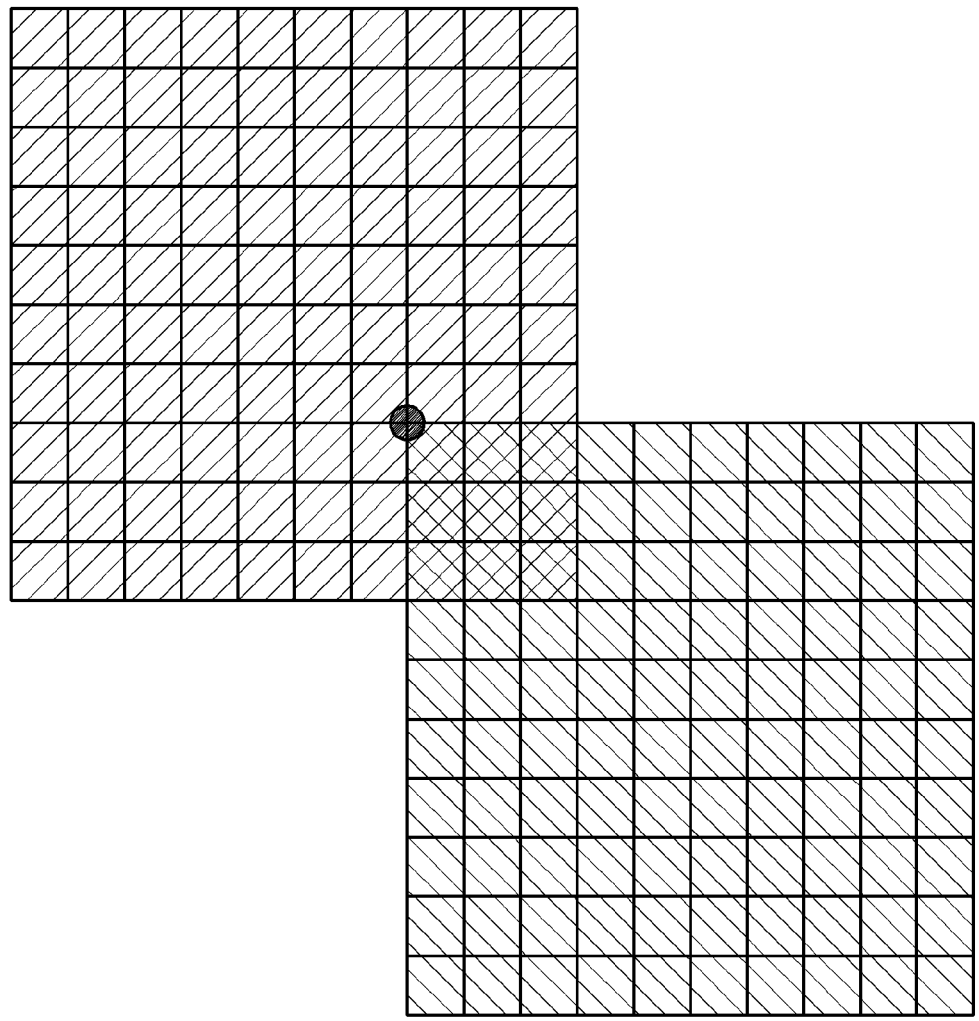
FIG. 2 is a diagram of a reference frame and a comparison frame and an offset according to a second predicted location.

Please refer to FIG. 1 again, and also refer to FIG. 2. FIG. 2 is a diagram illustrating a reference frame and a comparison frame captured by a mouse moving at a particular velocity. As in FIG. 1, the reference frame is illustrated by a 10×10 block filled in with diagonal lines sloping to the right, and the comparison frame is illustrated by a 10×10 block filled in with diagonal lines sloping to the left. The offset between the two images is illustrated by the overlapped area having a cross-hatch pattern. Assume the frame rate for the mouse is the same in FIG. 1 and FIG. 2. In FIG. 1, the mouse is moving at a first velocity. In FIG. 2, the mouse is moving at a second velocity which is faster than the first velocity. The overlapped area in FIG. 2 is therefore smaller than the overlapped area in FIG. 1, because the mouse has moved a further distance before capturing the comparison frame.

The system will use this increase in velocity as a basis for determining the predicted location. As shown in FIG. 1, the predicted location for cross-correlation is determined at (5,5) and, in FIG. 2, the predicted location for cross-correlation is determined at (7,7). In the conventional art, the size of the scale for the cross-correlation check is a fixed value, regardless of the predicted location. Using this fixed scale, there is therefore a higher chance of detecting a runaway situation (whether real or false) for the situation shown in FIG. 2 than for the situation shown in FIG. 1. This detection will stop the motion of the mouse cursor and require resetting of the navigation process, which limits the maximum achievable tracking velocity of the mouse.

The present invention therefore provides a scaling table, which utilizes the predicted location as a basis for sizing the scale used in the cross-correlation check. When the velocity of the mouse is greater, the size of the scale will be smaller.

For illustration with an array size of 10×10 or 100 pixels, the different scale sizes according to the predicted location can be stored in a look-up table (LUT) as illustrated below.

| Predicted location (x, y) | Overlapped area (number of pixels) | Scale (Overlap area/ Total area) |
|---|---|---|
| (0, 0) | 10 × 10 = 100 | 100/100 = 1 |
| (1, 1) | 9 × 9 = 81 | 81/100 = 0.81 |
| (2, 2) | 8 × 8 = 64 | 64/100 = 0.64 |
| (3, 3) | 7 × 7 = 49 | 49/100 = 0.49 |
| (4, 4) | 6 × 6 = 36 | 36/100 = 0.36 |
| (5, 5) | 5 × 5 = 25 | 25/100 = 0.25 |
| (6, 6) | 4 × 4 = 16 | 16/100 = 0.16 |
| (7, 7) | 3 × 3 = 9 | 9/100 = 0.09 |
| (8, 8) | 2 × 2 = 4 | 4/100 = 0.04 |
| (9, 9) | 1 × 1 = 1 | 1/100 = 0.01 |

Please note that the above is for a mouse moving at a 45° angle, but the above method works for any angle.

By inputting the predicted location to the LUT, a corresponding scale value can be output and used for the cross-correlation check. Dynamically adjusting the size of the scale according to the predicted location (and therefore the velocity of the mouse) will give more accurate results with respect to a runaway situation determination. The above method also reduces the chance of performing unnecessary navigation resetting as well as removing a limit on maximum tracking velocity for the mouse.

The invention therefore provides an LUT which, when provided with a predicted location of a mouse, maps to a particular scale size corresponding to the predicted location for performing a cross-correlation check. The dynamic scale size for cross-correlation check prevents erroneous detection of a runaway situation of the mouse, which also enables the maximum tracking velocity limit of the mouse to be increased. The user is therefore able to experience a mouse with greater range of motion and velocity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for dynamically setting a scale for performing a cross-correlation check between a reference image and a comparison image of a mouse, the method comprising:
    setting a plurality of scale sizes for a cross-correlation check, the plurality of scale sizes corresponding to a plurality of predicted locations for cross-correlation, respectively;
    determining a velocity of motion of the mouse, and using the determined velocity to generate a predicted location for performing cross-correlation;
    selecting a scale size according to the predicted location; and
    performing the cross-correlation check according to the scale size.

2. The method of claim 1, wherein the step of setting a plurality of scale sizes comprises:
    providing a lookup table (LUT) for mapping the plurality of scale sizes to the plurality of predicted locations for the cross-correlation;
    and the step of selecting a scale size comprises:
    inputting the generated predicted location to the LUT and mapping to a scale size corresponding to the generated predicted location.

3. The method of claim 1, wherein the predicted location corresponds to a size of an overlapped area between the reference image and the comparison image, and the size of the scale is directly proportional to the size of the overlapped area.

* * * * *